Figure 7:
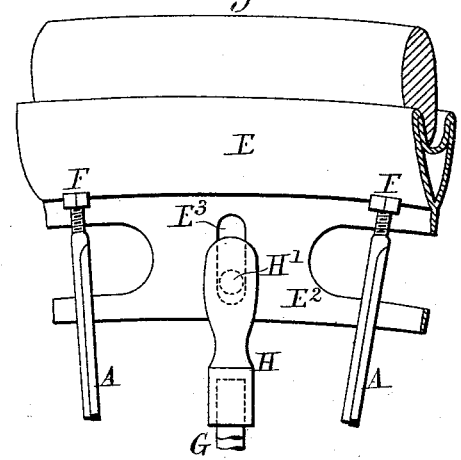
Figure 8:
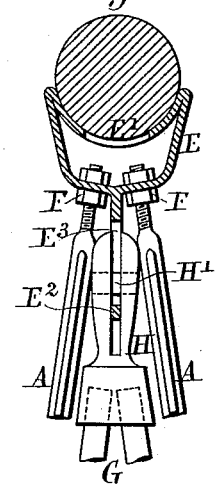

(No Model.) 2 Sheets—Sheet 1.
R. JEWELL.
WHEEL.
No. 480,586. Patented Aug. 9, 1892.
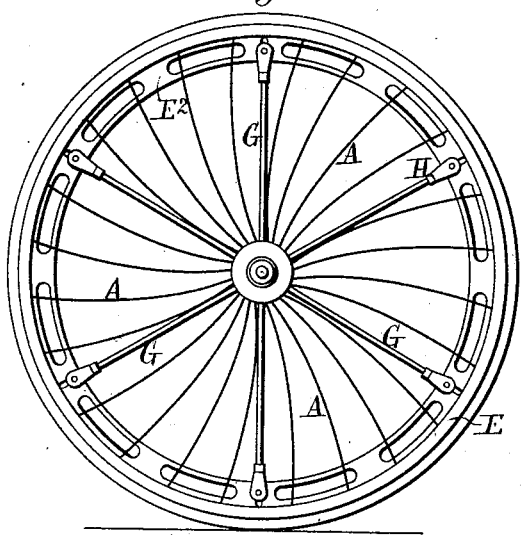
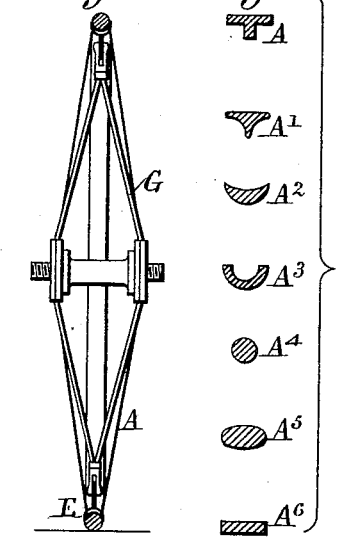
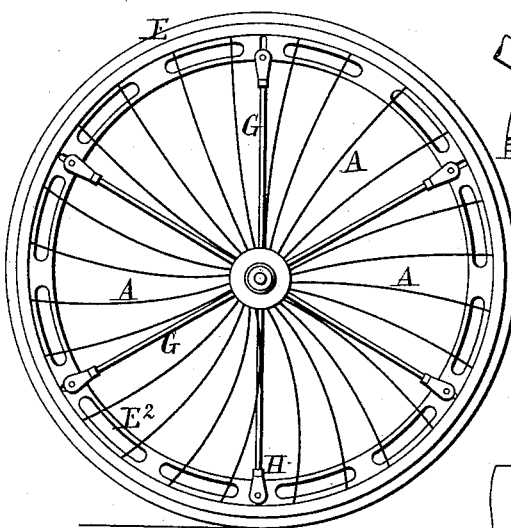
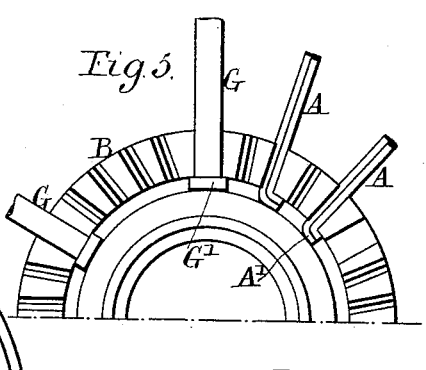
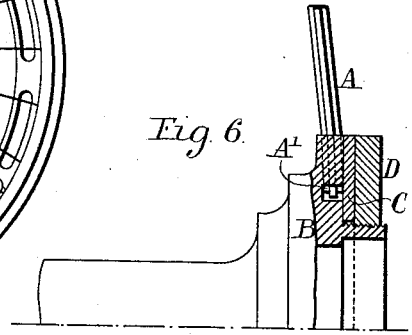

(No Model.)
2 Sheets—Sheet 2.

R. JEWELL.
WHEEL.

No. 480,586.
Patented Aug. 9, 1892.

UNITED STATES PATENT OFFICE.

ROBERT JEWELL, OF LONDON, ENGLAND.

WHEEL.

SPECIFICATION forming part of Letters Patent No. 480,586, dated August 9, 1892.

Application filed March 29, 1892. Serial No. 426,895. (No model.) Patented in England April 29, 1891, No. 7,410, and January 28, 1892, No. 1,733; in Belgium March 25, 1892, No. 98,954, and in Italy April 26, 1892, LXII, 158.

*To all whom it may concern:*

Be it known that I, ROBERT JEWELL, a citizen of England, residing at 181 Queen Victoria Street, in the city of London, England, have invented new and useful Improvements in Wheels for Bicycles, Tricycles, and other Vehicles, (for which I have obtained patents in Great Britain, dated April 29, 1891, No. 7,410, and January 28, 1892, No. 1,733; in Belgium, dated March 25, 1892, No. 98,954, and in Italy April 26, 1892, Vol. LXII, 158,) of which the following is a specification.

This invention relates to an improved construction of wheels for bicycles, tricycles, and other vehicles whereby the spokes of the wheel are so constructed as to form an elastic connection between the metal tire and the nave or boss, whereby the shocks or jolts to which the wheel-tires are subjected in riding over uneven ground are in great measure prevented from being transmitted to the seat of the rider or to the body of the vehicle. For this purpose instead of making the spokes of tightly-stretched wires, as heretofore, I make them of steel rods or bands, all having a slight curvature in their length, such curvature lying in the plane of the wheel, so that each spoke constitutes an arched spring-blade, which after being straightened out will resume its curved shape again. Thus when the nave of the wheel is loaded with the weight of the rider it will sink into a more or less eccentric position relatively to the tire until the uppermost spoke or spokes for the time being is or are stretched straight, or nearly so, all the other spokes in the upper half of the wheel being also stretched to a certain degree, while all those in the lower half will be bent to an increased curvature. On the wheel-tire coming in contact with an obstacle on the road the result will be that the boss, not being directly impeded by the obstruction, will shift forward to a certain extent, the spokes at the rear side of the wheel being thereby straightened out to a greater degree, while those on the front side assume an increased curvature. By this means a certain elastic action is afforded between the boss of the wheel and its tire, which will prevent the shock imparted to the latter by the obstruction being imparted to the boss except in a very reduced degree.

In order to impart to the spokes the requisite stiffness to resist the lateral displacement of the boss relatively to the plane of the tire, they are made with a more or less flat cross-section—such as a flat segment of a circle, or a flat triangle, or a flat rectangle—with or without one or more stiffening-ribs thereon, or it may be of a crescent or V shape, and there may either be two sets of such spokes inclining from either side of the boss toward the plane of the tire, as in ordinary wheels, or there may be in addition a middle set of spokes in the plane of the tire, and these sets may be tied across by transverse pieces at one or more points of their length; or, again, there may be only a single set of spokes in the plane of the tire, made of steel bands tapering from a comparatively large width at the boss to a small width at the tire. For the sake of lightness such tapering spokes may have a portion of their surface stamped out. I prefer, however, to effect such lateral staying of the spokes by means of separate stay-spokes arranged, as I will proceed to describe, with reference to the accompanying drawings, in which—

Figure 1 shows a side elevation of the wheel when unloaded. Fig. 2 shows an elevation of the same when loaded. Fig. 3 shows a cross-section. Figs. 4 to 9 show details to an enlarged scale.

The spokes A of the wheel are formed of steel, having a permanent curvature such as indicated, the curvature being greater or less, according to the strength of the spokes and degree of elasticity that may be required. The cross-section of such spokes may be variously modified. By preference they are made of the T-section shown at A, Fig. 4. They may, however, be triangular, segment-shaped, trough-shaped, or even cylindrical, elliptic, or rectangular, as at $A'$ $A^2$ $A^3$ $A^4$ $A^5$ $A^6$. When the axle of the wheel so constructed is loaded with the weight of the rider, the upper spokes will be straightened out more or less, while the lower ones will receive a correspondingly-increased curvature. Thus the load will be suspended from the tire of the wheel with a certain amount of spring action that will greatly lessen the shocks when riding over uneven ground.

It is preferred that the strength of the spring-spokes shall be such that when loaded the upper ones shall still retain a slight curvature. The spokes are by preference fixed to the nave and to the tire, as shown in the enlarged part front view and part section of the nave at Figs. 5 and 6 and the part elevation and cross-section of the tire at Figs. 7 and 8.

Figure 9:
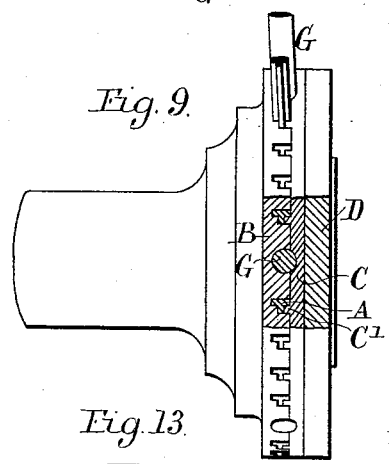

The extreme inner end of the spoke A is bent sharply to a right angle to form a head A', and the end of the spoke is fitted into a groove in the face of the nave-disk B, such groove having a configuration corresponding to the section of the spoke, as shown at Fig. 9, and the spoke is secured in that position by ribs C' on a plate C, which fits against the disk B and is secured to the latter by a second plate D, which is secured to B either by screw-bolts passing through both parts or by screwing D onto the nave, as shown at Fig. 6. The upper ends of the spokes have a screw-thread formed on them, and they are secured to the hollow metal tire E by means of internal and external screw-nuts F, as shown, the tire being made with flat surfaces at the requisite angle for the nuts to bear against, as shown. Access is gained to the inner nuts through holes at E'.

Figure 10:
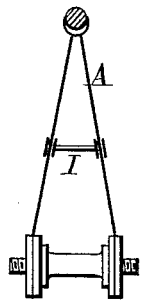
Figure 11:
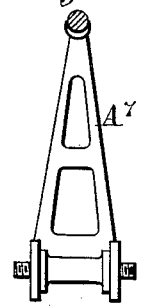

Various arrangements may be adopted for preventing lateral displacement of the nave relatively to the tire in consequence of the yielding nature of the spokes. Thus the spokes can be stiffened laterally by tying them across at one or more points, as at I, Fig. 10, or they may be made of considerable width in a lateral direction, or, instead of two oppositely-inclined spokes, there may be a single broad tapering spoke, as at $A^7$, Fig. 11; but by preference I employ for this purpose, in combination with the elastic spokes, the arrangement of stay-spokes shown. It consists of a series of pairs of strong straight stay-spokes G, either of a circular, T, or other section, the inner ends of which are formed with heads G' and fit into larger grooves in the plates B and C, as shown at Figs. 5 and 9, while the upper ends are screwed into a forked piece H. This forked piece embraces a flange $E^2$, formed on the inner circumference of the tire, to which the fork is connected by a pin H', passing through a slot $E^3$ in the flange $E^2$, such slot being of sufficient depth to prevent the pin H' from touching the outer end thereof when the nave has been displaced relatively to the tire in the vertical plane of the latter, so as to bring the pin of the uppermost spoke G to bear against the inner end of its slot, and being also of such a width as to leave some lateral play between its sides and the pin H'. Thus it will be seen that while the stays G effectually prevent any lateral shifting of the nave relatively to the tire they in no way interfere with the before-described elastic action of the spokes. The flange $E^2$ may be perforated, ornamentally or otherwise, between the points where the stays are attached; or, instead of a continuous flange, lugs may be fixed to the tire at such points.

Figure 12:
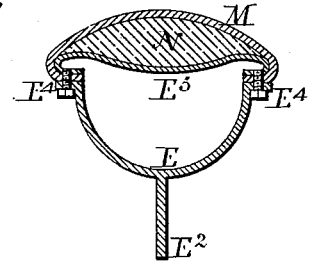

With wheels constructed as above described sufficient elastic action is obtained by means of the spring-spokes to enable the ordinary solid or tubular caoutchouc tire to be dispensed with. I therefore in some cases prefer to construct the tires of such wheels as shown in the cross-section at Fig. 12. The trough-shaped metal tire E in this case has flanges $E^4$ formed on either side. Upon these is fitted a hoop $E^5$, the edges of which are doubled under, as shown, and a band of caoutchouc M, stretched over a packing of cork N or other suitable light substance, has its edges brought between the flanges $E^4$ and the hoop $E^5$, which are then secured together by screws, so as to nip the caoutchouc tight between them. By this means I obtain a somewhat elastic tire offering a considerable surface for bearing on the road. The band of caoutchouc M might also be made thicker in the middle to take the place of the cork or other packing.

Figure 13:
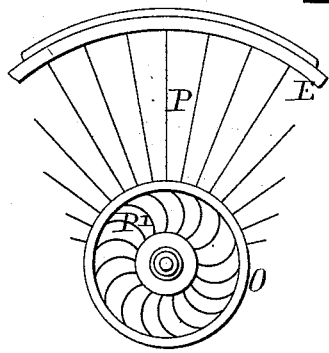
Figure 14:
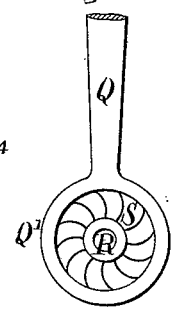

According to another improvement, instead of making the before-mentioned curved spokes of the wheel to extend the whole distance from the nave to tire, I in some cases construct the wheel as shown at Fig. 13, where the tire E is connected to a ring or drum O by straight-stretched spokes P of the ordinary description, and this ring or drum is connected to the boss or nave of the wheel by short curved spokes P', the elastic action of which is precisely the same, only in a somewhat less degree, as the curved spokes A; or, according to another modification, (shown at Fig. 14,) I construct the wheels entirely in the usual manner, and I make the fork Q of the framing with circular loop Q', which is connected to a separate bearing R for the wheel-axle by curved-spring spokes S, which will also have a similar effect to that of the spokes A in affording elastic action when riding over rough roads.

Having thus described the nature of this invention and in what manner the same is to be performed, I claim—

1. A bicycle, tricycle, and similar road-wheel having spring-spokes made with an arc-shaped curvature in the plane of the wheel, the inner ends of said spring-spokes being formed with hooks or heads fitting grooves of the boss, in which they are secured by an inner plate C, having lateral ribs C' entering into the grooves, and an outer plate D, secured by screwing, substantially as described.

2. In a bicycle, tricycle, and similar road-wheel, the combination of a metal tire or rim E with flange $E^2$, spring-spokes A, made with an arc-shaped curvature in the plane of the wheel, and rigid stay-spokes G, the inner ends of which are secured to the boss or nave of the wheel, while the outer ends are connected to the flange E² by a slotted connection that will allow of the requisite vertical play of the boss or nave in the plane of the wheel, substantially as described.

3. In a bicycle, tricycle, and similar road-wheel, the combination of a metal tire or rim E with flanges E² E⁴, hoop E⁵, packing N, and caoutchouc band M, spring-spokes A, made with an arc-shaped curvature in the plane of the wheel, and rigid stay-spokes G, the inner ends of which are secured to the boss or nave of the wheel, while the outer ends are connected to the flange E² by a slotted connection that will allow of the requisite vertical play of the boss or nave in the plane of the wheel, substantially as described.

In testimony whereof I have signed my name to this specification, in the presence of two subscribing witnesses, this 14th day of March, A. D. 1892.

ROBT. JEWELL.

Witnesses:
OLIVER IMRAY,
*Patent Agent, 28 Southampton Buildings, London, W. C.*
JNO. P. M. MILLARD.
*Clerk to Messrs. Abel & Imray, Consulting Engineers and Patent Agents, 28 Southampton Buildings, London, W. C.*